United States Patent
Have

(10) Patent No.: US 11,863,102 B2
(45) Date of Patent: Jan. 2, 2024

(54) LINEAR ACTUATOR SYSTEM AND A METHOD OF SETTING UP AND PROGRAMMING POWER LIMIT VALUES FOR SUCH AN ACTUATOR SYSTEM

(71) Applicant: LINAK A/S, Nordborg (DK)

(72) Inventor: Søren Have, Sønderborg (DK)

(73) Assignee: Linak A/S, Nordborg (DK)

( * ) Notice: Subject to any disclaimer, the term of this patent is extended or adjusted under 35 U.S.C. 154(b) by 289 days.

(21) Appl. No.: 17/436,483

(22) PCT Filed: Mar. 4, 2020

(86) PCT No.: PCT/DK2020/000062
§ 371 (c)(1),
(2) Date: Sep. 3, 2021

(87) PCT Pub. No.: WO2020/177823
PCT Pub. Date: Sep. 10, 2020

(65) Prior Publication Data
US 2022/0190771 A1   Jun. 16, 2022

(30) Foreign Application Priority Data
Mar. 4, 2019 (DK) .......................... PA 2019 00292

(51) Int. Cl.
| *H02K 17/32* | (2006.01) |
| *H02K 23/68* | (2006.01) |
| *H02K 21/30* | (2006.01) |
| *H02P 29/032* | (2016.01) |
| *A61G 7/10* | (2006.01) |
| *F16H 25/20* | (2006.01) |

(52) U.S. Cl.
CPC .......... *H02P 29/032* (2016.02); *A61G 7/1017* (2013.01); *F16H 25/2021* (2013.01)

(58) Field of Classification Search
CPC .. H02P 29/032; A61G 7/1017; F16H 25/2021
USPC ........................................................ 318/434
See application file for complete search history.

(56) References Cited

U.S. PATENT DOCUMENTS

| 5,761,963 | A  | * | 6/1998 | Hartwig ................ F16K 31/048 74/89.41 |
| 8,791,661 | B2 | * | 7/2014 | Duits .................. F16H 25/2015 318/135 |
| 2009/0218975 | A1 |   | 9/2009 | Bastholm |
| 2013/0038263 | A1 | * | 2/2013 | Faucher ................. B66C 15/00 318/434 |

FOREIGN PATENT DOCUMENTS

DE   199 50 689 A1   11/2000

\* cited by examiner

*Primary Examiner* — Erick D Glass
(74) *Attorney, Agent, or Firm* — Dykema Gossett PLLC

(57) ABSTRACT

A linear electric actuator system, preferably for patient lifters, comprising at least one linear electric actuator and a controller having a power limiting circuit for limiting the power to the at least one linear electric actuator. The actuator system is arranged such that the threshold value of the maximum permissible power in the power limiting circuit may be changed, and that this change may be performed via reference to the position of the spindle nut on the spindle as a look up in a table showing a corresponding value for the power limit.

15 Claims, 4 Drawing Sheets

Figure 1:
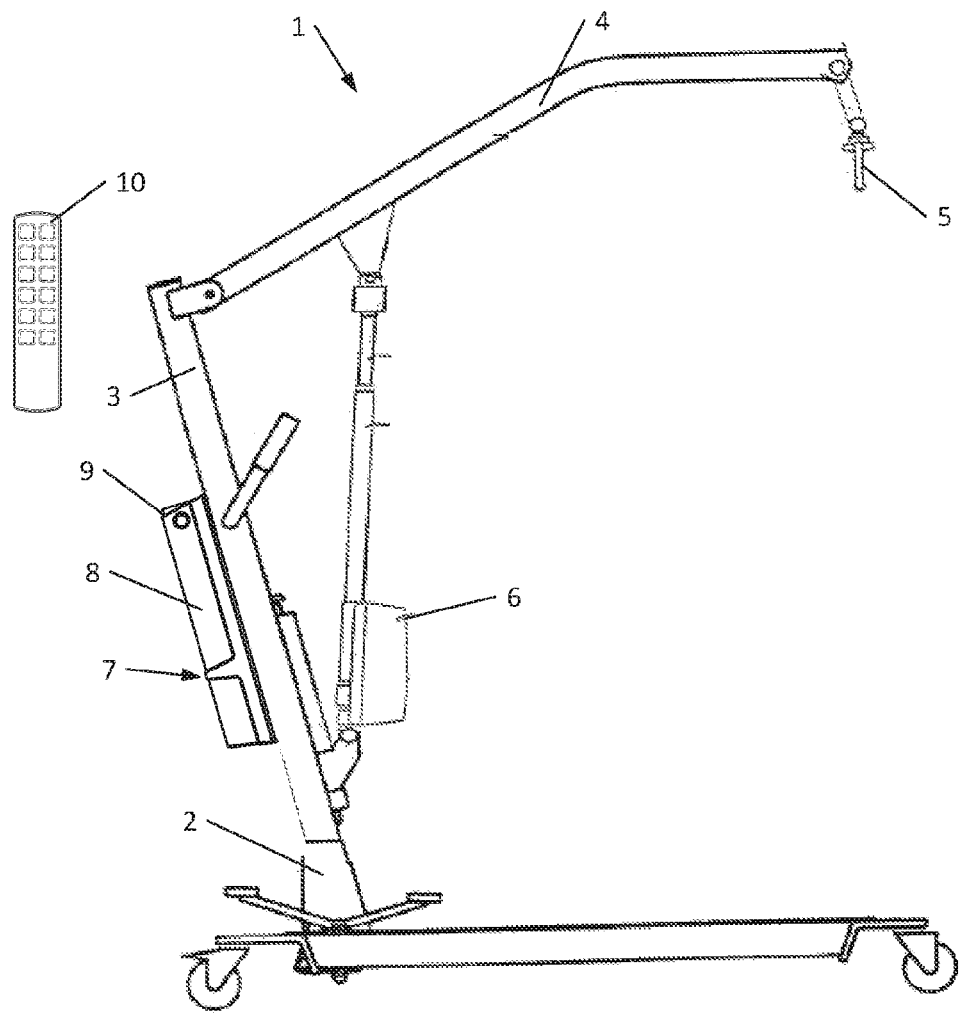

LINEAR ACTUATOR SYSTEM AND A METHOD OF SETTING UP AND PROGRAMMING POWER LIMIT VALUES FOR SUCH AN ACTUATOR SYSTEM

CROSS-REFERENCE TO RELATED APPLICATIONS

This application is a national stage filing based upon International PCT Application No. PCT/DK2020/000062, filed 4 Mar. 2020, which claims the benefit of priority to Denmark application No. PA 2019 00292, filed 4 Mar. 2019.

The present invention relates to linear electric actuators and the control of linear electric actuators. More specifically the invention relates to overload protection of the linear electric actuator itself or the mechanical application into which the linear electric actuator is integrated and utilized for performing a movement. Further the invention relates to a method of calibration of the overload protection to ensure that the linear electric actuator will not yield a force that amounts to more than a prescribed permissible force.

The components that amounts to a linear electric actuator system and to the linear electric actuator itself is defined in the introductory portion of claim 1.

For convenience, the disclosure of the invention will be based on patient lifters as disclosed e.g. in DE 199 50 689 A1 to Okin. The patient lifter is a stand-alone device comprising a frame provided with wheels and having a cantilever which is rotatable about a horizontal axis. A lifting sling for the patient may be secured at the end of the cantilever. Raising and lowering of the patient is performed by a linear electric actuator which is mounted on the frame and is connected with the cantilever. It is a safety requirement (standard EN10535 for medical approval EN60601) that patient lifters must not be capable of lifting more than one and one-half times the specified maximum load. In the prior art it has been taken advantage of that there is a direct relation between power consumption and load. The power consumption can be determined by measurement of the current draw which in an easy way can be monitored by the controller which in case the current draw exceeds a predetermined level can be adapted to cut the supply to the linear electric actuator and optionally indicate to the user that the patient lifter is overloaded.

However, it has been discovered that there is a great spread of the power necessary to lift a given load, which means that the patient lifters can lift far more than the permissible load. It is not readily possible to limit the spread of the power in an acceptable manner. The same will apply in other mechanical devices driven by a linear electric actuator and for which the static geometry of the device changes due to the displacement of the mechanical moveable components accomplished by the linear electric actuator.

WO2007/054092 to LINAK A/S disclosing a patient lifter provides a solution that in a very fine way solves the outlined problem. More specifically a calibration cycle of the patient lift lifting a specified load is performed, and the maximum current draw is determined and stored for future overload determination reference. If the current draw of the linear electric actuator exceeds the stored reference value the controller is adapted to cut the supply to the linear electric actuator.

However, safeguarding the patient lifter implementing an overload protection, will not fully safeguard the patient lifter since it merely safeguards the linear actuator against overload and not the mechanics of the patient lifter itself. This is due to that it is not automatically to be assumed that the worst-case condition for the linear actuator matches the situation where the mechanics of the patient lift has the worst-case condition. To the contrary, it has been discovered, that the two scenarios are not overlapping but can be fully out of synchronisation with each other. More specifically it has been discovered that the design of the patient lifter and especially the geometry of the patient lift over the dynamic range of movement, specified by the stroke of the linear electric actuator, to a high extent defines how the lifting capability of the linear electric actuator potentially can be destructive for the patient lifter mechanics. More specifically, the lifting of the cantilever will change the angle of which the linear electric actuator put force into the construction which will result in that the linear electric actuator will be capable of a higher lifting capability where the load is directed in the line of force of the linear electric actuator itself. If an overload protection is scheduled for a maximum yield at a stroke of the linear electric actuator where the load is not pushed directly in the line of force of the linear electric actuator, the linear electric actuator will be able to push a much higher load when the push is in the line of force of the linear electric actuator. The force applied by the linear electric actuator can thus overload the mechanical construction into which the linear electric actuator is integrated without exceeding the safety overload protection settings for the linear electric actuator itself. The same applies if the linear electric actuator is arranged in the construction in order to pull a load.

There seems to be room for an improvement, where the overload protection of the linear electric actuator also takes the limitations of the mechanics of the application into account in order to in a more safe way to comply with the requirements of the standard and safeguard not only the linear electric actuator against overload but as intended by the standard also safeguard the mechanics of the application against overload in order to avoid a hazardous situation with a potential risk of personal injury.

Thus, the object of the invention is to provide a linear electric actuator system for which it may be ensured that the permissible load on both the linear electric actuator and the mechanical parts that amounts to the mechanical application itself cannot be exceeded.

This is achieved according to the invention by constructing the actuator system as stated in claim 1 where the linear actuator system comprises a system for determining the position of the spindle nut on its travel on the spindle, and where the power limiting circuit is adapted to change its power limit value in response to the position of the spindle nut on its travel on the spindle to programmed power limit values that are stored with the controller and mapped to the position of the spindle nut on its travel on the spindle.

More specifically, the invention discloses a linear actuator system comprising at least one linear electric actuator, a power supply and a controller, where the linear electric actuator comprises a spindle and a spindle nut arranged on the spindle and secured against rotation, further comprising an electric motor connected to the spindle/spindle nut arrangement and where the controller comprises a memory for storing power limit values and a power limiting circuit limiting the power to be supplied to the at least one linear electric actuator to a programmed power limit value stored in the memory where the linear actuator system comprises a system for determining the position of the spindle nut on its travel on the spindle, and where the power limiting circuit is adapted to change its power limit value in response to the position of the spindle nut on its travel on the spindle to programmed power limit values that are stored in the memory and mapped to the position of the spindle nut on its travel on the spindle.

In an embodiment, the controller is adapted to change the power limit value when a programmed position of the spindle nut on its travel on the spindle is reached.

In an embodiment, the power limit value is a fixed value defined for an interval between two mapped positions of the spindle nut its travel on the spindle and for which the actual position of the spindle nut on the spindle is between said two mapped positions.

The power limit values that correspond to mapped positions of the spindle nut on its travel on the spindle is in an embodiment programmed directly in memory in the controller. The mapped position for which the power limit value apply is in an embodiment an interval specified by two mapped positions of the spindle nut on its travel on the spindle. In that case there will be a difference depending on the direction of movement. Thus, in an embodiment, the controller is adapted for determining and applying a power limit value during a movement in a first direction of the spindle nut on its travel on the spindle such that when a mapped position is reached, the power limit value is set to the value corresponding to this mapped position in order to be kept until the next mapped position is reached for which a new power limit value applies for this new value to be set. This procedure is followed over the full travel of the spindle nut on the spindle for each mapped position where a change of power limit value is scheduled by programming.

For the sake of completion, in an embodiment, the controller is adapted for determining and applying a power limit value in a movement in a second direction of the spindle nut on its travel on the spindle, which is the reverse direction relative to the first direction of the travel of the spindle nut on the spindle, the power limit value is set to the value mapped with the next occurring position for changing the power limit value until the next mapped position is reached, for which a new power limit value applies for this new value to be set. This practice is necessary if only a small number of mapped positions is implemented for changing the power limit value over the travel of the spindle nut on the spindle. In an embodiment, where the number of mapped positions is high and the change in power limit value between neighbouring mappings is small, it can be neglected, and the change made in a simple way to the value corresponding directly to the mapped position reached.

In an embodiment, the controller is configured to compare the position determined by the position system for determining the position of the spindle nut on its travel on the spindle with a reference value programmed in the controller and if the condition is met that the position value is changing state from being higher than the reference value to lower than the reference value or changing state from being lower than the reference value to higher than the reference value, the controller will change the power limit value accordingly to the appropriate value programmed with the controller corresponding to the power limit value mapped to the position. In an embodiment, the controller is adapted to include a hysteresis value before determining if a change of power limit value should be applied.

In an embodiment, the power limit value is a dynamic value defined by interpolation between power limit values of the two mapped positions of the travel of the spindle nut on its travel on the spindle that are the closest lower position and the closest higher position relative to the actual position of the spindle nut on its travel on the spindle.

In an embodiment, the controller is configured to determine the two mapped positions that are closest to the actual position of the spindle nut and to calculate the difference in the power limiting value between the two values and to calculate the distance in travel between the two mapped positions and calculate the relative change in value over the distance and calculate the dynamic value by interpolation of the values to match the actual position of the spindle nut.

The controller will then adapt the power limiting circuit to use the new power limit value as threshold for cutting the power to the linear electric actuator if this power limit value is exceeded.

It is appreciated if the inventive feature for simplicity is implemented directly in the linear electric actuator itself or in a controller arranged with the linear electric actuator in the same housing or in a separate housing still being a part of the complete linear electric actuator system.

A method of setting up and programming power limit values to be used as threshold values in a power limiting circuit in a controller for a linear electric actuator system comprises the steps of loading the linear electric actuator until it yields the maximum permissible force, and to during a travel of the spindle nut on its travel on the spindle, record the position of the spindle nut on its travel on the spindle and the corresponding power as data pairs and enter the recorded values as a table of threshold values to be used by the power limiting circuit.

In practical embodiments of the invention the functions can be implemented in software where an algorithm will monitor, compare and respond with setting of the power limit value that will apply for a safe use of the device.

Figure 2:
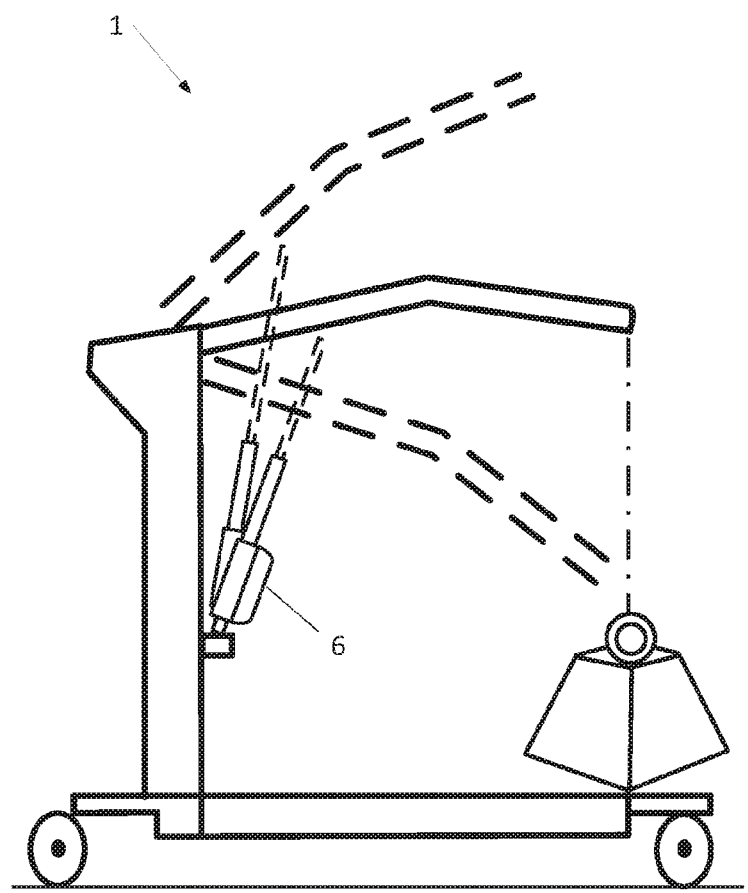
Figure 3:
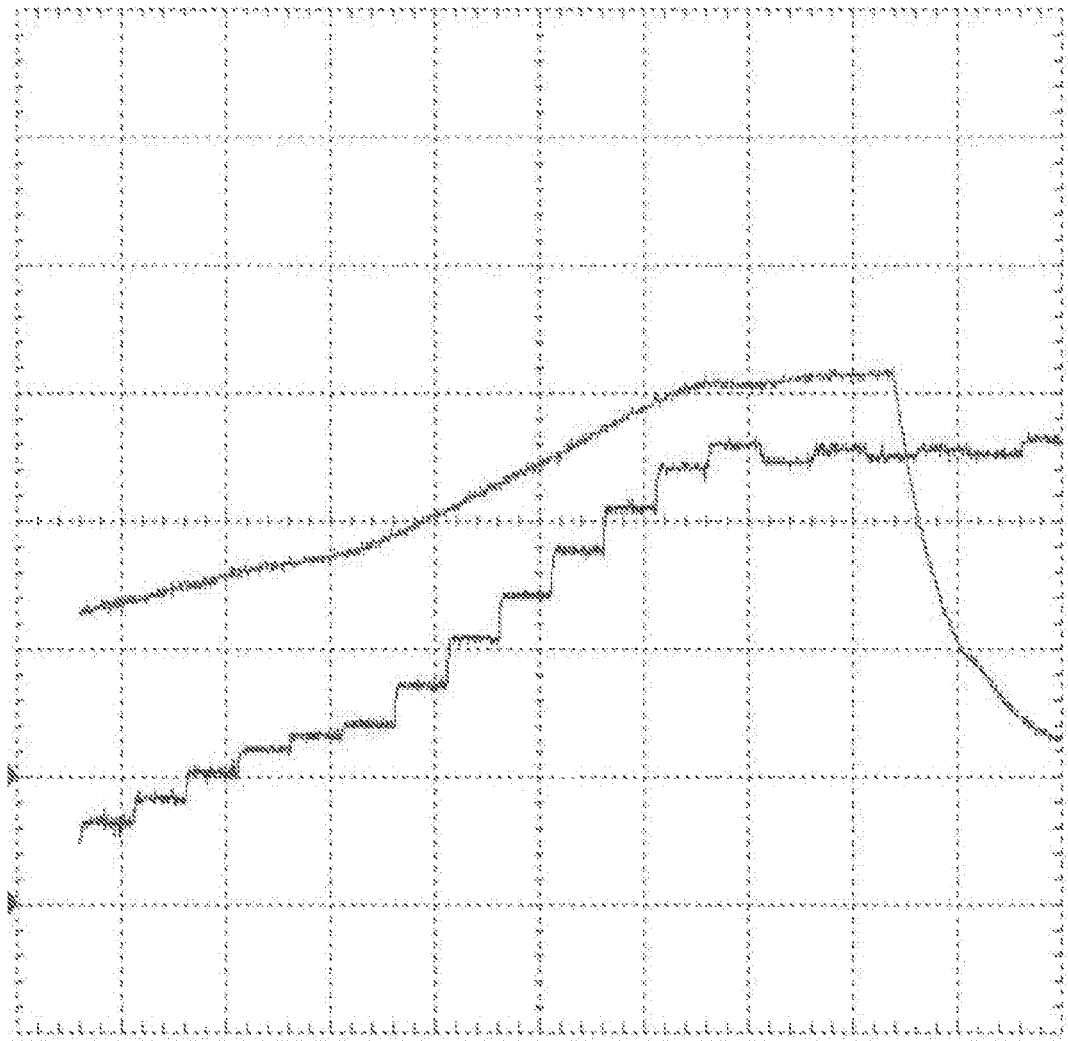
Figure 4:
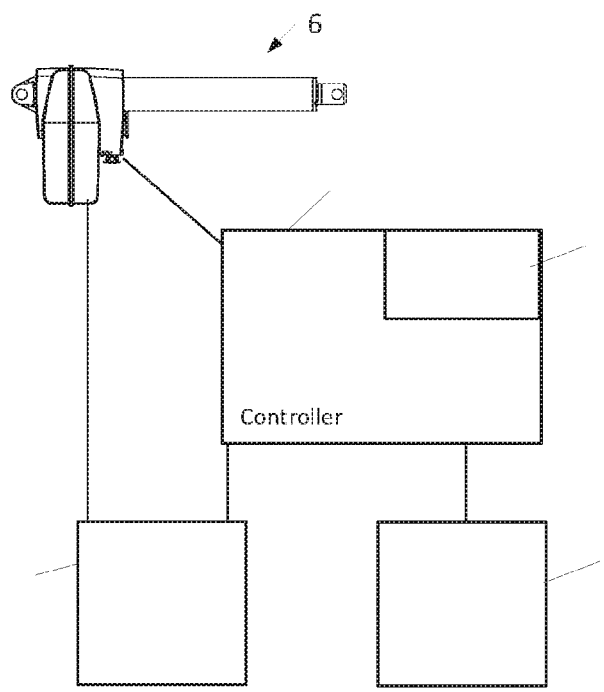

The invention will be described more fully below with reference to the accompanying drawing, in which:

FIG. 1 shows a patient lifter seen from the side,
FIG. 2 shows a patient lifter with a load,
FIG. 3 shows a diagram showing a loading curve and
FIG. 4 shows an overview of a linear electric actuator system.

FIG. 1 shows a patient lifter 1 comprising stabilizer legs 2 equipped with drive wheels, a mast 3 connected to the stabilizer legs 2 and a cantilever 4 with one end pivotably connected to the mast 3. To the other end of the cantilever 4, a lifting hook 5 for lifting a patient is secured. The patient lifter 1 comprises an electric linear actuator system having an electric linear actuator 6, a control box 7 with a controller, a power supply 8, an emergency stop 9 and an operating unit 10. The cantilever 4 may be raised and lowered by means of a linear actuator 6, which with one end is secured to the frame and with the other end is secured to the cantilever 4. The control box 7 is fixed to the mast 3 with a bracket 16.

FIG. 2 shows a patient lifter 1 which carries a load. As it can be seen, the geometry of the patient lifter 1 is changed due to the lifting of the cantilever 4. More specifically the length of the cantilever arm in the horizontal and vertical orientation changes which influences the power needed for the linear electrical actuator in order to push the load.

As it appears in FIG. 3, showing a diagram with the linear electric actuator pushing a load, the patient lifter requires a big difference in push force from the actuator (and thereby a big difference in current draw) at different height positions. If the patient lifter is of the type where the controller is having a power limiting circuit limiting the power to be supplied to the at least one linear electric actuator to one programmed power limit value stored with the controller there could potentially be a safety problem. In the diagram, the maximum current recorded is 3.5 A to lift the load. Because the current draw is only 0.5 A to lift the load at low positions, the patient lifter will in theory be able to lift more than seven times the rated load as the current is set to cut off at 3.5 A.

FIG. 4 shows an overall diagram of a linear electric actuator system featuring one linear electric actuator 6 and a controller 11. For the sake of simplicity is only shown the components relevant for the explanation. The linear electric actuator 6 is equipped with a system for position determination 12 of the spindle nut on its travel on the spindle which gives input to the controller 11. The controller 11 features a power limiting circuit 13 that is configured to cut the power to the linear electric actuator 6 in case the current draw exceeds a programmed value. Further the controller 11 is equipped with a table 14 of power limit values which is a reference to a specific position of the spindle nut during its travel on the spindle and a corresponding power limit value to be used by the controller when the spindle nut reaches the specific position. The controller has an algorithm that regularly updates the power limiting circuit 13 with the relevant up to date value such that the power limit circuit is configured to steadily live up to the requirements of the standard and to safeguard the mechanics of the application, here the patient lifter. The table 14 of power limit values can be provided by programming the controller with the specific values that suits the application. A learn mode can be implemented where the application over the full movement carries a max load and data pairs of position and current are recorded at suitable intervals to be used for the power limiting circuit.

What is achieved by the invention is that the actuator system is arranged such that the threshold value of the maximum permissible power in the power limiting circuit may be changed, and that this change may be performed via reference to the position of the spindle nut on the spindle as a look up in a table showing a corresponding value for the power limit to be utilized by the power limiting circuit.

The invention claimed is:

1. A linear actuator system,
comprising at least one linear electric actuator, a power supply and a controller
where the linear electric actuator comprises a spindle and a spindle nut arranged on the spindle and secured against rotation, further comprising an electric motor connected to the spindle/spindle nut arrangement and
where the controller comprises a memory for storing power limit values and a power limiting circuit limiting the power to be supplied to the at least one linear electric actuator to a programmed power limit value stored in the memory
characterized in that
the linear actuator system comprises a system for determining the position of the spindle nut on its travel on the spindle, and where
the power limiting circuit is adapted to change its power limit value in response to the position of the spindle nut on its travel on the spindle to programmed power limit values that are stored in the memory and mapped to the position of the spindle nut on its travel on the spindle.

2. A linear actuator system according to claim 1, characterized in that
the controller is adapted to change the power limit value when a programmed position of the spindle nut on its travel on the spindle is reached.

3. A linear actuator system according to claim 1, characterized in that
the power limit value is a fixed value defined for an interval between two mapped positions of the spindle nut on its travel on the spindle and for which the actual position of the spindle nut on the spindle is between said two mapped positions.

4. A linear actuator system according to claim 1, characterized in that
the power limit values that correspond to mapped positions of the spindle nut on its travel on the spindle are programmed directly in memory in the controller.

5. A linear actuator system according to claim 1, characterized in that
the mapped position for which the power limit value apply is an interval specified by two mapped positions of the spindle nut on its travel on the spindle.

6. A linear actuator system according to claim 1, characterized in that
the controller is adapted for determining and applying a power limit value during a movement in a first direction of the spindle nut on its travel on the spindle such that when a mapped position is reached, the power limit value is set to the value corresponding to this mapped position in order to be kept until the next mapped position is reached for which a new power limit value applies for this new value to be set.

7. A linear actuator system according to claim 1, characterized in that
the controller is adapted for determining and applying a power limit value in a movement in a second direction of the spindle nut on its travel on the spindle, which is the reverse direction relative to the first direction of the travel of the spindle nut on the spindle, the power limit value is set to the value mapped with the next occurring position for changing the power limit value until the next mapped position is reached for which a new power limit value applies for this new value to be set.

8. A linear actuator system according to claim 7, characterized in that
the controller is adapted to determining and applying a power limit value in case the number of mapped positions is high and the change in power limit value between neighbouring mappings are small, being the value corresponding directly to the mapped position reached.

9. A linear actuator system according to claim 1, characterized in that
the controller is configured to compare the position determined by the position system for determining the position of the spindle nut on its travel on the spindle with a reference value programmed in the controller and if the condition is met that the position value is changing state from being higher than the reference value to lower than the reference value or changing state from being lower than the reference value to higher than the reference value, the controller will change the power limit value accordingly to the appropriate value programmed with the controller corresponding to the power limit value mapped to the position.

10. A linear actuator system according to claim 1, characterized in that
the controller is adapted to include a hysteresis value before determining if a change of power limit value should be applied.

11. A linear actuator system according to claim 1, characterized in that
the power limit value is a dynamic value defined by interpolation between power limit values of the two mapped positions of the travel of the spindle nut on its travel on the spindle that are the closest lower position and the closest higher position relative to the actual position of the spindle nut on its travel on the spindle.

12. A linear actuator system according to claim 1, characterized in that
the controller is configured to determine the two mapped positions that are closest to the actual position of the spindle nut and to calculate the difference in the power limiting value between the two values and to calculate the distance in travel between the two mapped positions and calculate the relative change in value over the distance and calculate the dynamic value by interpolation of the values to match the actual position of the spindle nut.

13. A linear actuator system according to claim 1, characterized in that
the controller is configured to adapt the power limiting circuit to use the new power limit value as threshold for cutting the power to the linear electric actuator if this power limit value is exceeded.

14. A linear actuator system according to claim 1, characterized in that
the controller feature of determining the power limit value and applying the value for use as threshold value for cutting the power to the linear electric actuator is implemented directly in the linear electric actuator itself or in a controller arranged with the linear electric actuator in the same housing or in a separate housing still being a part of the complete linear electric actuator system.

15. A method of setting up and programming power limit values to be used as threshold values in a power limiting circuit in a controller for a linear electric actuator system characterized in that that the linear electric actuator is loaded until it yields the maximum permissible force, and that during a travel of the spindle nut on its travel on the spindle, the position of the spindle nut on its travel on the spindle and the corresponding power is recorded as data pairs and entered as a table of threshold values to be used by the power limiting circuit.

* * * * *